US008647229B2

(12) United States Patent
Ai et al.

(10) Patent No.: US 8,647,229 B2
(45) Date of Patent: Feb. 11, 2014

(54) LOAD SPLIT MECHANISM FOR GEAR TRANSMISSION

(75) Inventors: Xiaolan Ai, Massillon, OH (US); Curt Orkin, West Hartford, CT (US); Randy P. Kruse, North Canton, OH (US); Ryan Forbes, Massillon, OH (US); Matthew Wilmer, North Canton, OH (US); Bradley Smith, Lebanon, NH (US); Neil Chiavaroli, Hamden, CT (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 13/640,644

(22) PCT Filed: Apr. 13, 2011

(86) PCT No.: PCT/US2011/032229
§ 371 (c)(1),
(2), (4) Date: Oct. 11, 2012

(87) PCT Pub. No.: WO2011/130352
PCT Pub. Date: Oct. 20, 2011

(65) Prior Publication Data
US 2013/0035194 A1 Feb. 7, 2013

Related U.S. Application Data

(60) Provisional application No. 61/323,648, filed on Apr. 13, 2010.

(51) Int. Cl.
*F16H 57/08* (2006.01)
(52) U.S. Cl.
USPC .............................. 475/340; 475/331; 475/348

(58) Field of Classification Search
USPC .................................. 475/331, 338–340, 348
See application file for complete search history.

(56) References Cited

U.S. PATENT DOCUMENTS

| 6,966,865 | B2 | 11/2005 | Drago et al. |
| 7,507,180 | B2 | 3/2009 | Robuck |
| 8,287,422 | B2* | 10/2012 | Tseng ........................... 475/331 |
| 2004/0259678 | A1* | 12/2004 | Stille et al. .................... 475/331 |
| 2005/0049107 | A1* | 3/2005 | Willmot et al. ............... 475/339 |
| 2005/0188520 | A1* | 9/2005 | Simon ........................ 29/407.05 |

OTHER PUBLICATIONS

International Search Report for PCT application PCT/US2011/032229 mailed Jun. 24, 2011.
Written Opinion of the International Search Authority for PCT application PCT/US2011/032229.

* cited by examiner

*Primary Examiner* — Justin Holmes
(74) *Attorney, Agent, or Firm* — Polster, Lieder, Woodruff & Lucchesi, L.C.

(57) ABSTRACT

A method and apparatus for a transmission system selectively positioning sets of planet gear support bearings (50, 55, 80, 90) to achieve an optimized load distribution among a set of drive planet pinions (22) and a set of idler planet pinions (70) disposed in engagement between two reaction gears (30, 40) in the transmission system (A, A1), for splitting an applied load between at least two pathways between an input and an output.

20 Claims, 9 Drawing Sheets

LOAD SPLIT MECHANISM FOR GEAR TRANSMISSION

CROSS-REFERENCE TO RELATED APPLICATIONS

The present application is related to, and claims priority from, U.S. Provisional Application Ser. No. 61/323,648 filed on Apr. 13, 2010, and International Application PCT/US2011/032229 filed Apr. 13, 2011 and published under International Publication No. WO 2011/130352, by Ai et al. for "Load Split Mechanism for Gear Transmission", both of which are herein incorporated by reference.

STATEMENT REGARDING FEDERALLY SPONSORED RESEARCH

Not Applicable.

BACKGROUND OF THE INVENTION

The present invention relates, in general, to a load sharing mechanism for power transmissions and in particular to a load sharing mechanism for gear transmission with stepped gears.

Rotary wing aircraft typically uses high-speed turbine engine to drive the rotor or propeller. A main gear transmission between the engine the rotor is necessary to transmit engine power while reducing the engine speed to the appropriate rotor speed. The main gear transmission is usually the heaviest subsystem in the drive train of the aircraft. Increasing power throughput and reducing the weight of the transmission is very desirable for modern rotary wing aircraft.

One effective way to improve power density is to divide the input torque from the gas turbine engine into multiple paths. Each path uses a smaller individual gear member which leads to an overall transmission design that is lighter in weight, compact in size and has smaller gear face width due to the lower loads in each gear mesh. The smaller but numerous gears also require smaller bearings which have increased life span due to less applied torque.

One embodiment of a power dense planetary gear transmission consists of a compound planetary gear-train having a set of stepped planet gears. Each stepped planet gear includes a large planet gear and a small drive planet pinion. The stepped planet gears may have flexible or pivot-able shaft. A set of small and simple idler planet pinions supported by a planet carrier are employed to share the torque, distributing load carried by the transmission among the drive planet pinions and the idler planet pinions. The idler planet pinions have non-floating shaft with respect to the planet carrier.

Alternative transmission configurations such as split-torque face gear transmission may also be utilized, where a stepped gear is used to drive a primary face gears and two idler face gears that sandwich the primary face gear. The stepped gears have fixed shaft. Small idler gears were used as crossover gears to provide multiple power paths to share the load. Similarly, the idler gears also have fixed shafts.

Load sharing mechanisms may be disposed within a power dense planetary gear transmission. These load sharing mechanisms may include a stepped gear cluster having a large gear and a small drive gear. The small drive gear meshes with two reaction gears, and the load sharing is achieved through a mechanical mechanism where a support structure of stepped gear cluster is devised utilizing a single pivoting support bearing which is selectively positioned between the large and small gears of the stepped gear cluster. The support structure and position of the pivoting support bearing allows the tangential forces of the small drive planet gear at mesh points with two reaction gears to be partitioned to achieve a desired load sharing ratio between the two reaction gears edge loading may occur if the gear teeth were not properly crowned.

Accordingly, it would be advantageous to provide a flexible support structure in a gear transmission that allows for partitioning of a load between two reaction gears as desired, and for partitioning of a load between cluster support bearings to optimize the load distribution among drive planet pinions and idler planet pinions, and to maintain parallel gear engagement. In doing so, the maximum load capacity can be achieved.

BRIEF SUMMARY OF THE INVENTION

Briefly stated, the present disclosure provides a power dense planetary gear transmission with a flexible support structure that allows a load to be split between two reaction gears as desired, and between a set of cluster support bearings to optimize the load distribution among drive planet pinions and idler planet pinions, maintaining proper parallel gear alignment for maximum load capacity.

In an alternate embodiment, the present disclosure provides a face gear transmission with a flexible support structure that allows a load to be split between two reaction gears as desired, and between a set of cluster support bearings to optimize the load distribution among drive planet pinions and idler planet pinions, maintaining proper parallel gear alignment for maximum load capacity.

As a method, the present disclosure provides a procedure for selectively positioning a set of support bearings to achieve an optimized load distribution among drive planet pinions and idler planet pinions in a transmission system incorporating a split gear assembly for splitting an applied load between two reaction gears or pathways.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
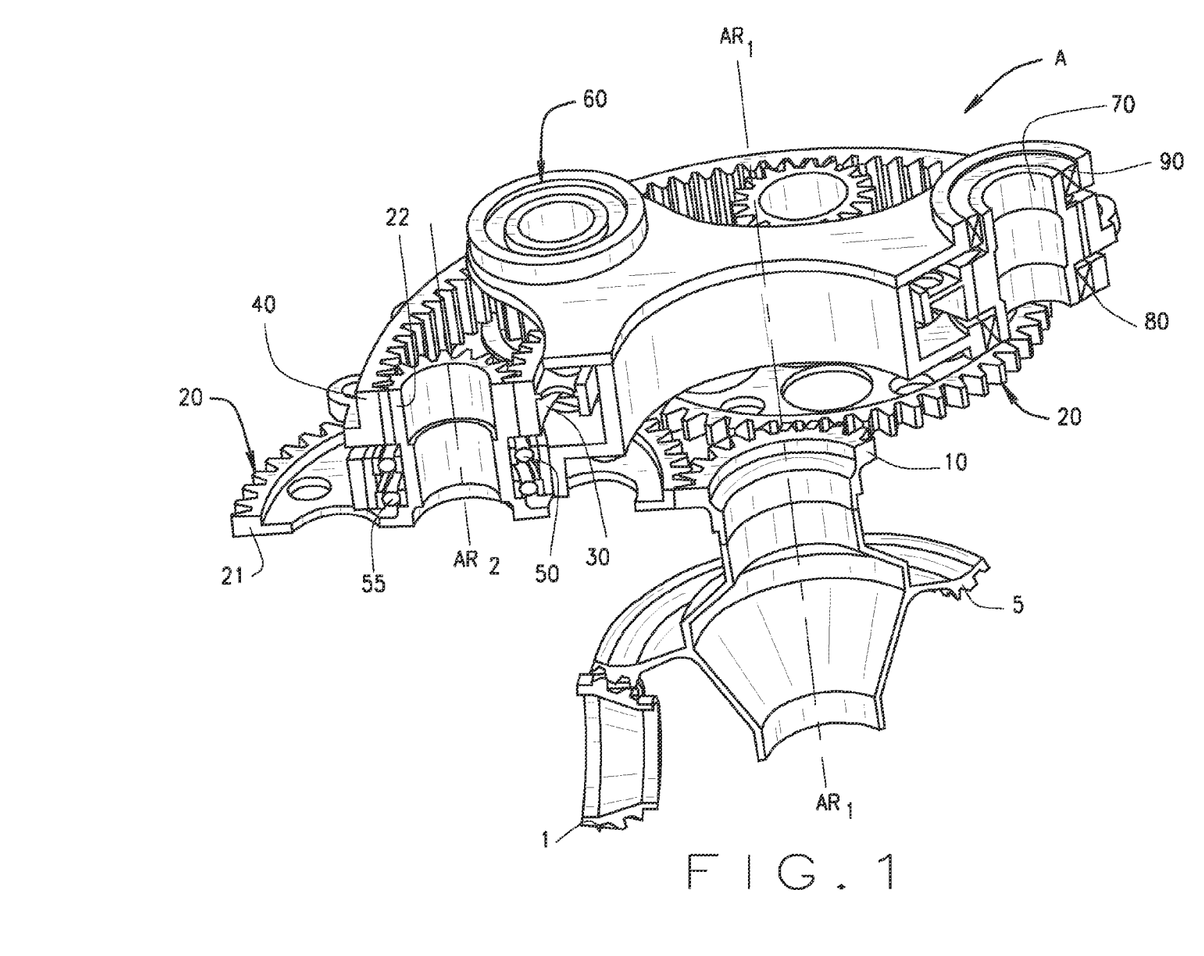
FIG. 1 is a cut-away perspective view of power dense planetary gear transmission incorporating a flexible support structure of the present disclosure in the form of a set of cluster support bearings.
Figure 2:
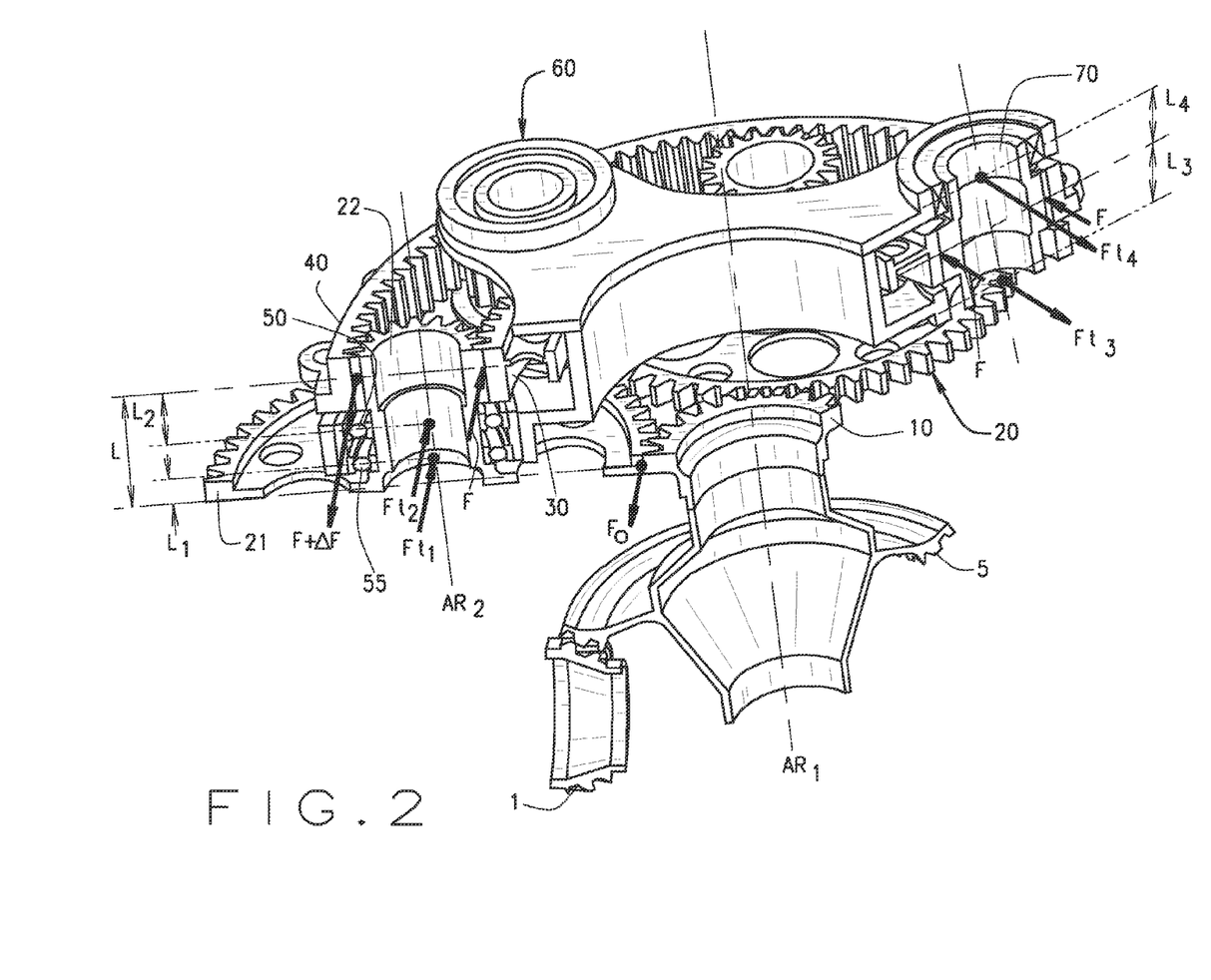
FIG. 2 is a cut-away perspective view similar to FIG. 1, illustrating vectors of interacting forces within the power dense planetary gear transmission.

Turning to the figures, and to FIGS. 1 and 2 in particular, an embodiment of present disclosure is shown generally incorporated into a power dense gear transmission (A). The gear transmission (A) includes a drive gear 10, a set of stepped cluster gears 20, each having a large gear 21 and a small drive planet pinion or gear 22, a first reaction gear 30, a second reaction gear 40, and a set of cluster gear support bearings 50 and 55.

The drive gear 10, driven via an associated bevel gear 1 and ring gear 5, defines a first axis of rotation $AR_1$, while each of the stepped cluster gears 20 defines an associated second axis of rotation $AR_2$. The two axis of rotation $AR_1$ and $AR_2$ define a plane S. The two gears in each stepped cluster gear 20 are spaced apart axially along the axis $AR_2$ by a distance L, as seen in FIG. 2. The first support bearing 55 is disposed between the large gear 21 and the small drive pinion 22 at a position that is at an axial distance $L_1$ from the large gear 21 along the axis $AR_2$. The second support bearing 50 is disposed between the large gear 21 and the small drive pinion 22 at an axial position which is at a distance $L_2$ along the axis $AR_2$ from the small drive pinion gear 22. The large gear 21 in the cluster gear has a pitch diameter of $D_0$, while the small drive pinion gear 22 has a pitch diameter of $D_1$. At the first bearing position, the first bearing 55 along with an associated housing structure provides an effective tangential support stiffness $KDt_1$ and an effective radial support stiffness $KDr_1$. At the second bearing position, the second bearing 50 along with an associated housing structure provides an effective tangential support stiffness $KDt_2$ and an effective radial support stiffness $KDr_2$.

The power dense gear transmission further includes a set of idler gears 70. Each idler gear 70 is straddle mounted on a common support structure (planet carrier) 60 through a third bearing 80 and a fourth bearing 90. The third bearing 80 is located axially at a distance $L_3$ from the center of the idler gear 70. The fourth bearing 90 is located axially at a distance $L_4$ from the center of the idler bearing 70. At the third bearing position, the third bearing 80, along with an associated housing structure in the planet carrier, provides effective tangential support stiffness $Klt_3$. At the fourth bearing position, the fourth bearing 90, along with an associated housing structure in the planet carrier, provides effective tangential support stiffness $Klt_4$ During operation of the transmission (A), the drive gear 10 meshes with the large gear 21 of each cluster gear 20, exerting a meshing force that has a tangential component $F_0$ perpendicular to the plane S defined by the axis $AR_1$ and $AR_2$. The first reaction gear 30 meshes with the small drive pinion gear 22 at the same side to axis $AR_1$ as does the drive gear 10. The mesh between the reaction gear 30 and the small drive pinion gear 22 generates a meshing force that has a tangential component F perpendicular to the plane S. The second reaction gear 40 meshes with the small drive pinion gear 22 on the opposite side from the first reaction gear 30. The mesh between the second reaction gear 40 and the small drive pinion gear generates a meshing force which has a tangential component $F+\Delta F$, similarly perpendicular to the plane S.

Figure 3:
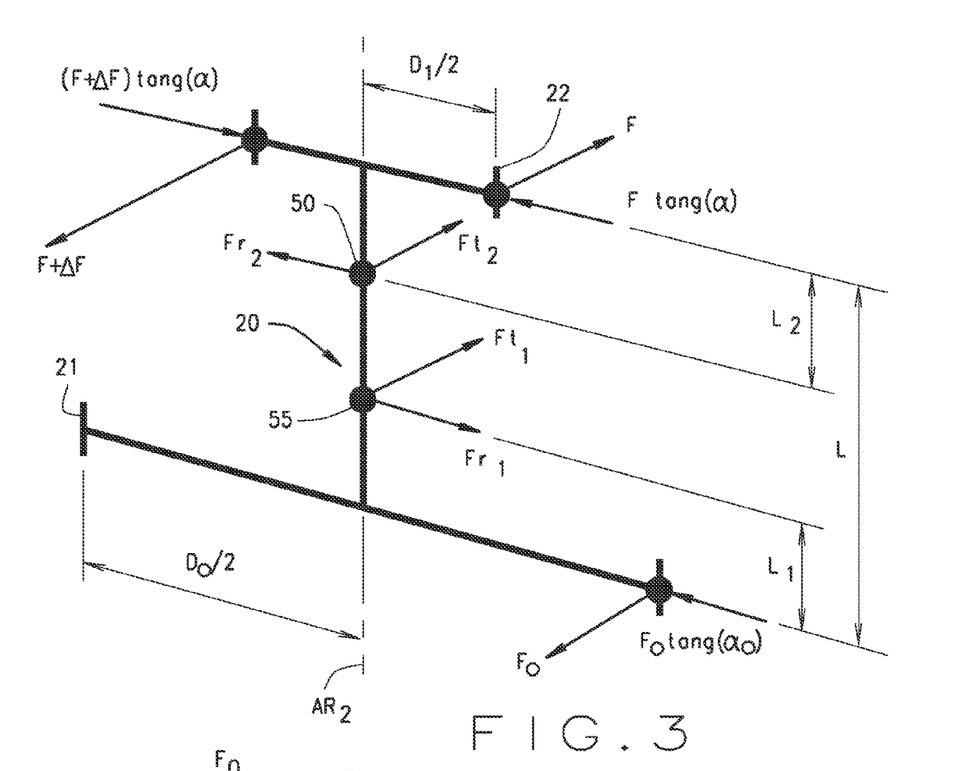
FIG. 3 is a perspective load diagram for a stepped cluster gear in the power dense planetary gear transmission of FIG. 1.
Figure 4:
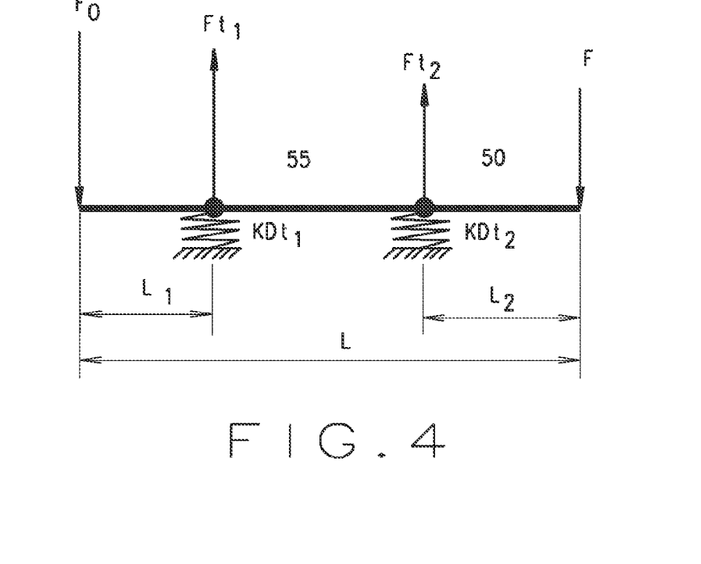
FIG. 4 is a tangential force balance diagram illustrating bearing loads in the tangential direction for first and second support bearings of a stepped cluster gear.

The meshing forces acting on the stepped cluster gear 20 are balanced by resulting forces in support bearings 50 and 55, as shown in the load diagram of FIG. 3. Similarly, FIG. 4 illustrates a tangential force balance diagram for the stepped cluster gear 20, where bearing loads in a tangential direction are $Ft_1$ for the first support bearing 55, and $Ft_2$ for the second support bearing 50. The effective bearing and housing support stiffness in tangential direction are $KDt_1$ for the first bearing position, and $KDt_2$ for the second bearing position.

Figure 5:
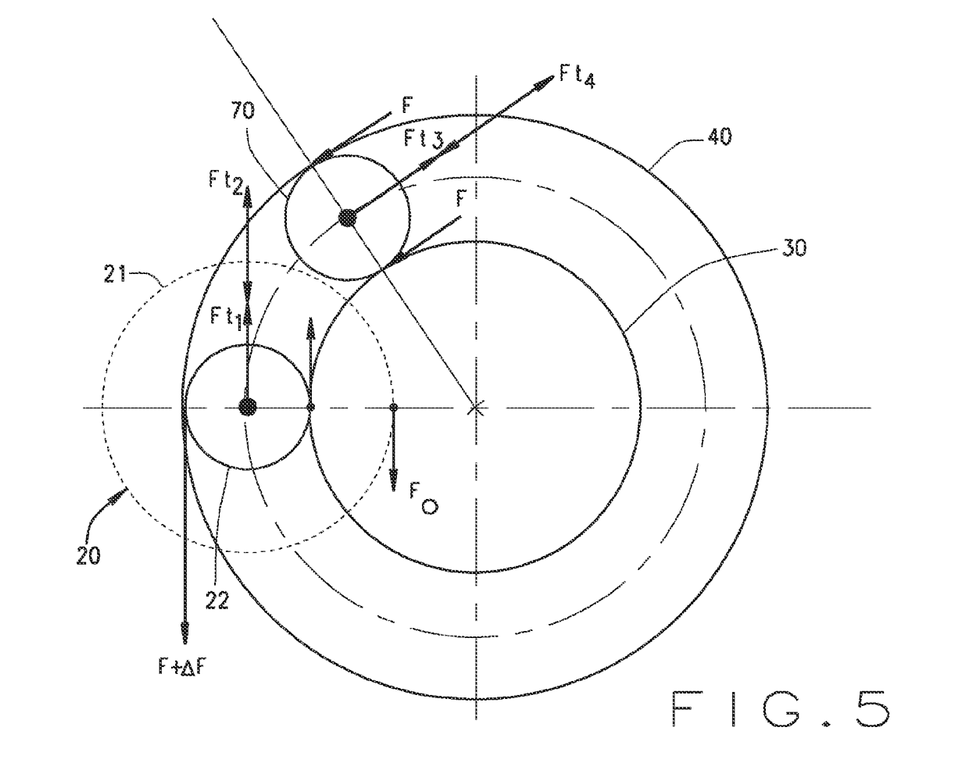
FIG. 5 is top plan view tangential force diagram fro the stepped cluster gear and idler gear of the power dense planetary gear transmission of FIG. 1.
Figure 6:
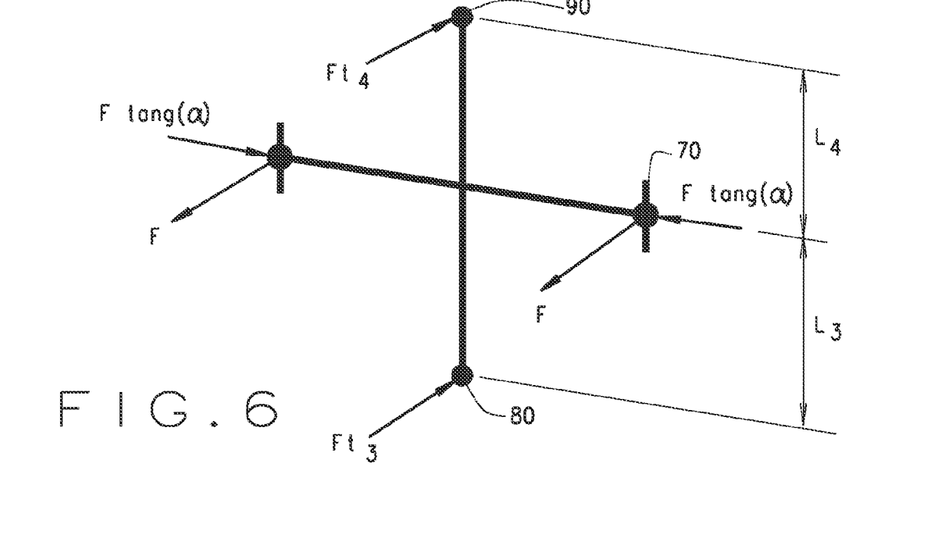
FIG. 6 is a perspective load diagram for an idler gear in the power dense planetary gear transmission of FIG. 1.

The first reaction gear 30 also meshes with the idler gears 70, transferring the tangential meshing force F to the idler gears 70. In doing so, the reaction gear 30 is rotationally balanced. Each idler gear 70, in turn further meshes with the second reaction gear 40, generating a matching tangential meshing force F to rotationally balance the tangential meshing force F received from the first reaction gear 30. In doing so, the third bearing 80 receives a tangential load $Ft_3$, and the fourth bearing 90 receives a tangential load of $Ft_4$, best seen in FIG. 5 which illustrates a tangential force diagram for a stepped gear 20 and an idler gear 70, as well as in FIG. 6 which is specific to an idler gear 70.

To partition the tangential meshing forces at the mesh with two reaction gears 30 and 40, while maintaining the various gears in parallel engagement, bearing positions $L_1$ and $L_2$ supporting the stepped gear 20 are carefully selected. Assuming that the desired ratio of the tangential meshing force generated between the first reaction gear 30 and the small drive pinion gear 22, relative to the tangential meshing force generated between the second reaction gear 40 and the small drive pinion gear 22 is:

$$LR_T \equiv \frac{F}{F + \Delta F} \qquad \text{(Eqn. 1)}$$

The bearing tangential force ratio of the second bearing 50 to the first bearing 55 is:

$$\phi_{21} \equiv \frac{Ft_2}{Ft_1} \qquad \text{(Eqn. 2)}$$

Correspondingly, for the idler gears, the bearing tangential force ratio of the fourth bearing 90 to the third bearing 80 is:

$$\phi_{43} \equiv \frac{Ft_4}{Ft_3} \qquad \text{(Eqn. 3)}$$

To achieve equilibrium or rotational balance, the following relationships have to be met $$\frac{L_1 + \phi_{21}(L - L_2)}{L - L_1 + \phi_{21} L_2} = \left(\frac{1 - LR_T}{1 + LR_T}\right) \frac{D_0}{D_1} \qquad \text{(Eqn. 4)}$$

and $$\frac{L_3}{L_4} = \phi_{43} \qquad \text{(Eqn. 5)}$$

where:

$D_0$ is the radius of the mesh circle to the large gear 21;
$D_1$ is the radius of the mesh circle of the small drive pinion gear 22;
$L_1$ is the center distance from large gear 21 to the first support bearing 55;
$L_2$ is the center distance from the small drive pinion gear 22 to the second support bearing 50;
$L_3$ is the center distance from the idler gear 70 to the third bearing 80; and
$L_4$ is the center distance from the idler gear 70 to the fourth bearing 90 (see FIG. 9).

Under tangential load, the center of the first bearing 55 experiences tangential displacement by amount equal to:

$$SDt_1 = \frac{Ft_1}{KDt_1} \qquad \text{(Eqn. 6)}$$

Similarly, the center of the second bearing 50 experiences a tangential displacement of an amount equal to:

$$SDt_2 = \frac{Ft_2}{KDt_2} \qquad \text{(Eqn. 7)}$$

To keep the cluster gear 20 properly aligned, minimizing both gear mesh misalignment, and edge loading, it is desirable to have $SDt_1 = SDt_2$. This leads to the following relationship:

$$\frac{KDt_2}{KDt_1} = \frac{Ft_2}{Ft_1} = \phi_{21} \qquad \text{(Eqn. 8)}$$

It is further desirable to have both $Ft_1$ and $Ft_2$ in the same direction to reduce bearing load. This is to say:

$$\phi_{21} \geq 0 \qquad \text{(Eqn. 9)}$$

Under a tangential load $Ft_3$, the center of the third bearing 70 experiences tangential displacement of the amount:

$$Slt_3 = \frac{Ft_3}{Klt_3} \qquad \text{(Eqn. 10)}$$

Under tangential load $Ft_4$, the center of the forth bearing 80, experiences tangential displacement of the amount:

$$Slt_4 = \frac{Ft_4}{Klt_4} \qquad \text{(Eqn. 11)}$$

To keep the idler gear 70 properly aligned, minimizing both gear mesh misalignment and edge loading, it is desirable to have $Slt_3 = Slt_4$. This leads to:

$$\frac{Klt_4}{Klt_3} = \frac{Ft_4}{Ft_3} = \phi_{43} \qquad \text{(Eqn. 12)}$$

To maintain integrity of gearing system $SDt_1 = SDt_2 = Slt_3 = Slt_4$ (Eqn. 13) must hold true, thus:

$$KR \equiv \frac{Klt_3}{KDt_1} = \frac{2(1 + \phi_{21})}{1 + \phi_{43}} \cdot \frac{LR_T \cdot DR}{1 + LR_T + (1 - LR_T) \cdot DR} \qquad \text{(Eqn. 14)}$$

or:

$$LR_T = \frac{KR \cdot (1 + \phi_{43}) \cdot (DR + 1)}{2(1 + \phi_{21}) \cdot DR + KR \cdot (1 + \phi_{43}) \cdot (DR - 1)} \qquad \text{(Eqn. 15)}$$

where:

$$DR \equiv \frac{D_0}{D_1} \qquad \text{(Eqn. 16)}$$

The following procedure implements the above relationships into the design process for a gear transmission (A) that incorporates a load sharing mechanism as presented in the current disclosure:

Step 1—Determine a load partitioning ratio $LR_T$ of the two reaction gears 30 and 40 using Eqn. (1), and determine bearing load partitioning ratios using Eqn. (2) and Eqn. (3); determine a cluster gear pitch diameter ratio using Eqn. (16).

Step 2—Select the bearings and their initial positions ($L_1$, $L_2$, $L_3$, and $L_4$) using Eqn. (4) and Eqn. (5); design and engineer bearings and supporting structures such as the planet carrier to achieve predetermined support stiffness (force) ratios; calculate and check actual support stiffness (force) ratios using Eqn. (8), Eqn. (12) and Eqn. (14). Iteratively repeat the design and engineering process, if necessary until actual support stiffness (force) ratios for the bearings which are within an acceptable tolerance of the predetermined support stiffness ratios are achieved.

Step 3—Calculate and check the actual gear load partitioning ratios using Eqn. (15), iteratively, and adjust using the previous step or step(s), if necessary, until a gear loading partitioning ratio which is within an acceptable tolerance of a predetermined gear load partitioning ratio is achieved.

Step 4—Chose and adjust support bearing positions ($L_1$, $L_2$, $L_3$, and $L_4$) using Eqn. (4) and Eqn. (5) together with the actual support stiffness ratios and gear load partitioning ratio(s).

The above process may be used alone, or along with other procedures, such as specifically configured planet carrier structures, to yield desirable solutions and design configurations having the required support stiffness.

Figure 7:
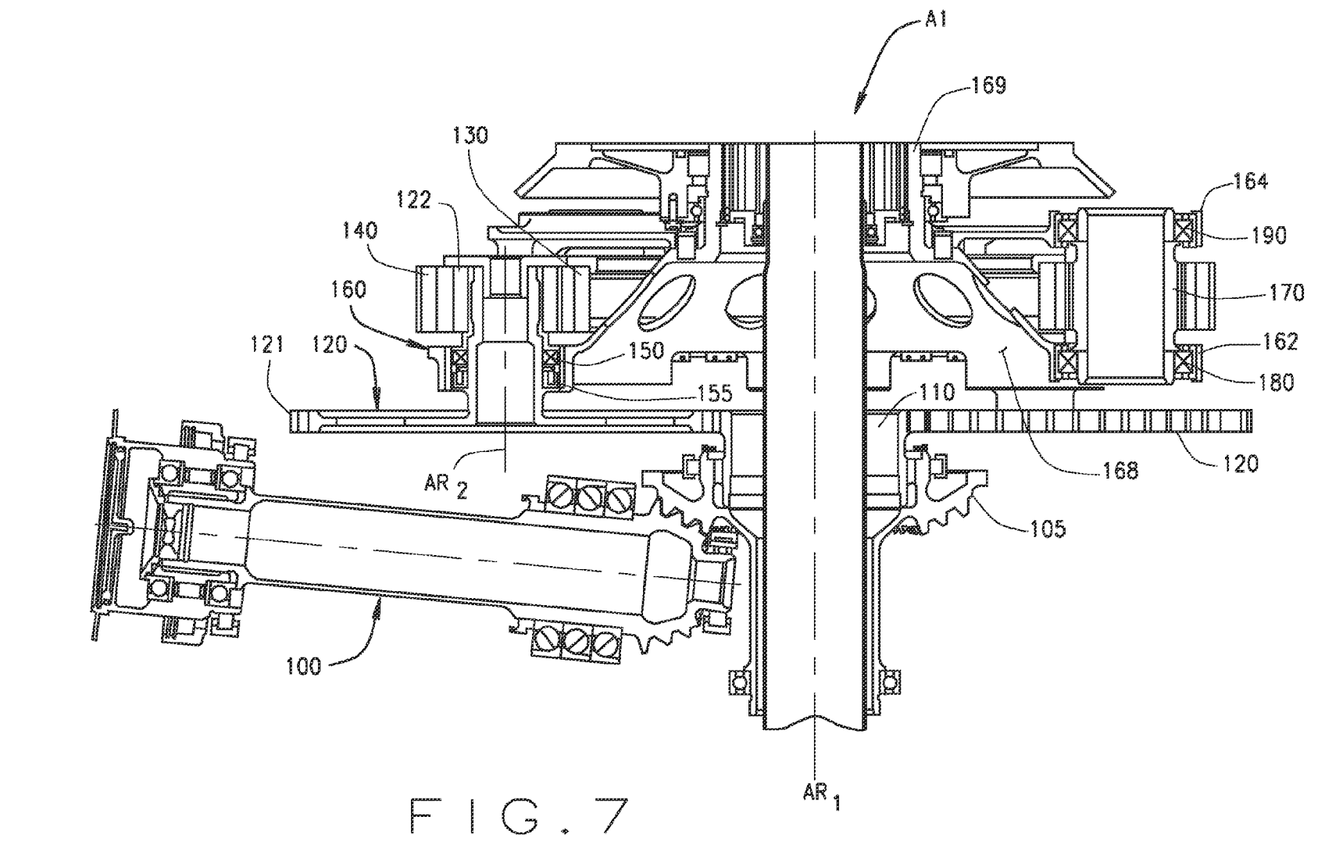
FIG. 7 is a sectional view of a helicopter main gear box incorporating the load sharing mechanisms of the present disclosure.

The load sharing concepts of the present disclosure may be utilized, for example, in a helicopter main gear box as seen at (A1) in FIG. 7. The gear system (A1) is a compound planetary gear train, coupled to a source of driving power (not shown) via a drive shaft 100 which is engaged with a ring gear 105 associated with drive gear 110. The drive gear 110 in turn is engaged with, and drives one or more planet cluster gears 120. Each planet cluster gear 120 consists of a large planet gear 121 and a drive planet gear 122 coaxially coupled thereto. Drive planet gears 122 each function as small drive pinions disposed between first and second reaction gears. The first reaction gear takes the form of an idler sun gear 130, and the second reaction gear taking the form of a fixed ring gear 140. A set of idler planet gears 170 are used in addition to the drive planet gears 122 to improve the load carrying capacity of the main gear box compound planetary gear train (A1). Within the compound planetary gear train (A1), a planet carrier 160 is utilized to support the various planet gears. Each planet cluster gear 120 is supported on the planet carrier 160 by a pair of bearings 150 and 155 mounted in associated housings having a degree of flexibility in the tangential direction. The first support bearing 155, together with an associated housing structure carried by the planet carrier 160 is configured to provide a relatively soft support in the tangential direction and a rigid support in the radial direction. Likewise, the second support bearing 150 provides relatively soft support in the tangential direction and a rigid support in the radial direction.

For each of the idler planet gears, the third support bearing 180, and the fourth support bearing 190, with their respective housing structures in the planet carrier 160, provide rigid supports in the tangential direction. This allows the drive planet gears 122 to float more easily than the idler planet gears 170 in the annular space between idler sun gear 130 and fixed ring gear 140, facilitating a transfer of a portion of the applied loads through a second power path. That is to say, the third and fourth bearing positions provide stiffer support for the idler planet gears than the first and second bearing positions provide for the drive planet gears.

As can be appreciated, the gear teeth of each drive planet gear 122 are subjected to uni-directional bending, while the gear teeth of the idler planet gears 170 are subjected to bi-directional bending. The maximum tangential force for the drive planet 122 is F+ΔF and the maximum tangential force for idler planet gear 170 is F. To maintain equal safety margin against gear tooth bending failure, it is highly desirable to have the idler planet gears 170 transmitting less tangential force than the drive planet gears 122. That is to say:

$$LR_T = \frac{F}{F + \Delta F} \le 1 \qquad \text{(Eqn. 17)}$$

In practical application, it is recommended to have a load partitioning ratio $LR_T$ between 0.5 and 1.0. The endurance limiting stress for a reverse bending gear tooth is roughly 70% of the endurance limiting stress for a unidirectional bending gear tooth. Thus, the load partitioning ratio $LR_T = 0.7$ is suggested. For practical considerations, it is desirable to adopt an equal tangential load partition between the first bearing 155 and the second bearing 150, and between the third bearing 180 and the fourth bearing 190. That is $\phi_{21}=1$ and $\phi_{43}=1$.

Consequently, the stiffness relationships at the first, second, third and the fourth bearing positions are determined as:

$$KDt_1 = KDt_2 \qquad \text{(Eqn. 18)}$$

$$KIt_3 = KIt_4 \qquad \text{(Eqn. 19)}$$

$$\frac{KIt_3}{KDt_1} = \frac{1.4DR}{1.7 + 0.3DR} \qquad \text{(Eqn. 20)}$$

The locations for the first and second bearings and for the third and fourth bearings along the respective axis about which they rotate are then determined as:

$$\frac{L + L_1 - L_2}{L - L_1 + L_2} = 0.1765DR \qquad \text{(Eqn. 21)}$$

and $$L_3 = L_4. \qquad \text{(Eqn. 22)}$$

Figure 8A:
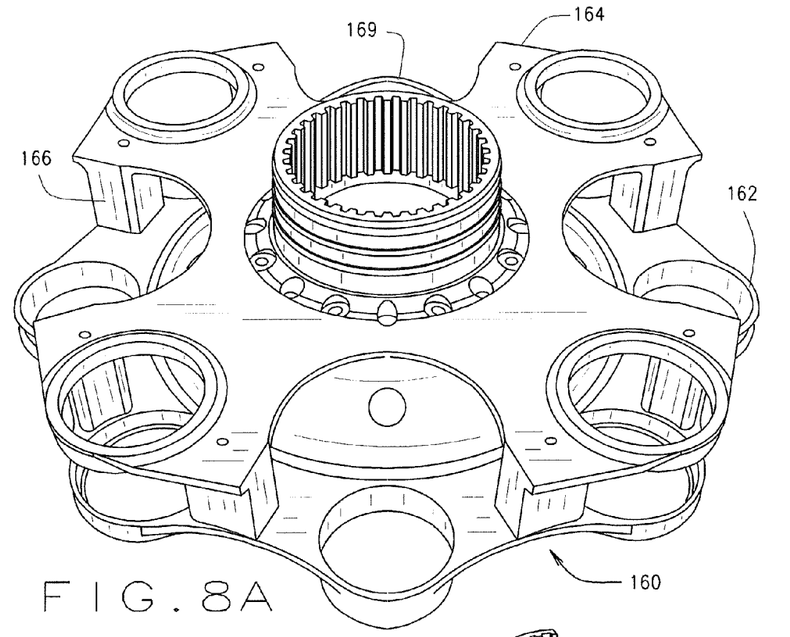
FIGS. 8A and 8B are perspective and cut-away perspective views of a planet carrier structure for use in the gear box of FIG. 7.
Figure 8B:
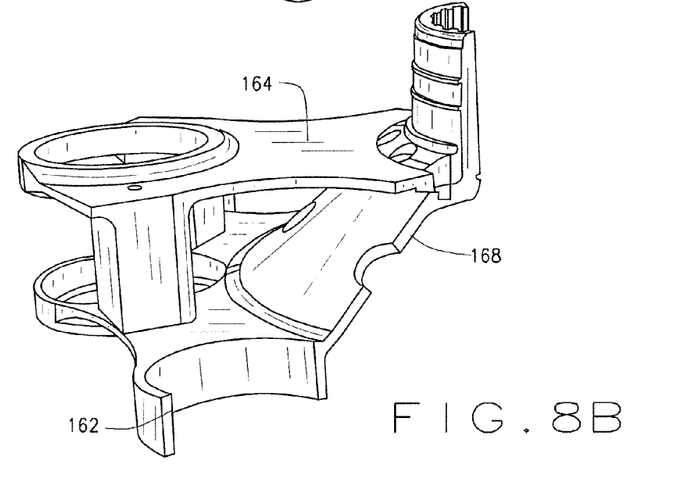

Turning to the FIGS. 8A and 8B illustrate an exemplary planet carrier for obtaining the desired stiffness relationships. The carrier structure includes a base hub 162 for supporting the drive planet gears 122 at equidistantly spaced housings, and a upper plate 164 which, in conjunction with the base hub 162, supports the idler planet gears 170, at equidistantly spaced and axially aligned reinforced housings. The base hub includes a tapered portion 168 and a splined boss 169. The upper plate 164 is supported in the axial direction by a set of support posts 166 disposed between the upper plate 164 and the base hub 162, about the circumference of the base hub 162. Those of ordinary skill in the art will recognize that are other carrier configurations that, in conjunction with suitable supporting bearings, will provide adequate support stiffness.

Figure 10:
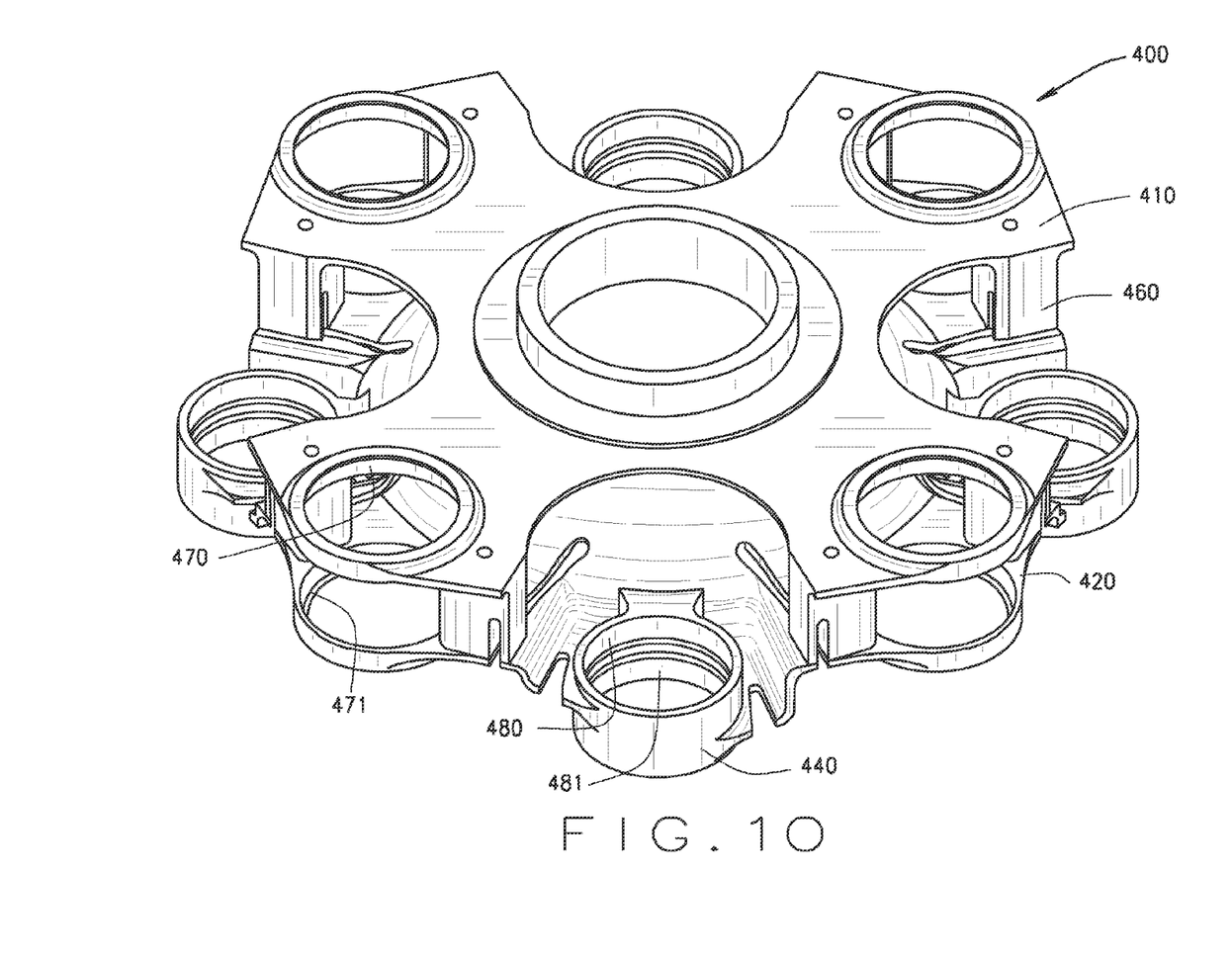
FIG. 10 is a perspective view of an alternate embodiment planet carrier structure.
Figure 11:
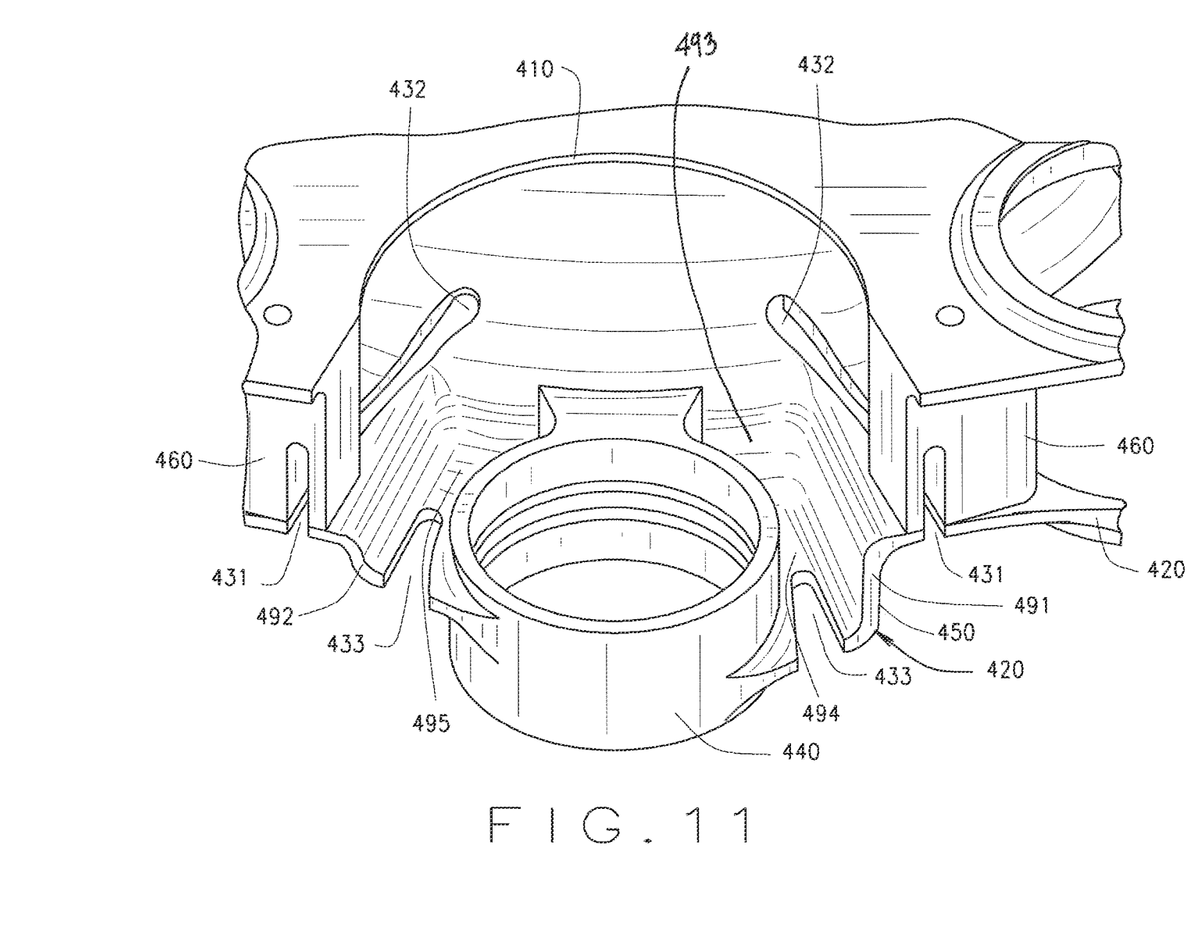
FIG. 11 is an enlarged view of a portion of FIG. 10.

For example, an alternate embodiment of the planet carrier structure for obtaining the desired support stiffness relationship is shown at 400 in FIGS. 10 and 11. The planet carrier 400 has a base hub 420 and an upper plate 410. The upper plate 410 has extrusion posts 460 for connecting with, and supporting relative to, the carrier base hub 420. Stiffened housings 470 and 471 are formed in the upper plate and base hub of the planet carrier for hosting the idle planet support bearings (180 and 190). Flexible housings 480 and 481 are formed from the base hub 420 for hosting the stepped planet gear support bearings (150 and 155). The flexible housings are constructed within a common hub 440 which is supported by offset horizontal walls 494 and 495 and vertical drop down walls 491, 492, and 493, as best seen in FIG. 11. Multiple relief channels (431, 432, and 433) are disposed in the structures of the planet carrier 400 to further provide flexibility for the stepped planet gear support in a circumferential direction, and for improved stress distribution. The drop down wall 491 (or 492), the hub body 440, and the channel 431 form a double "U" structure with the openings arranged in opposite directions. This helps to maintain the alignment as the axis of stepped gear moves circumferentially. The planet carrier structure thus created is capable of providing the required gear support stiffness ratios as defined by (Eqn. 8), (Eqn. 12) and (Eqn. 14) while maintaining the supported gears in proper alignment.

Figure 9:
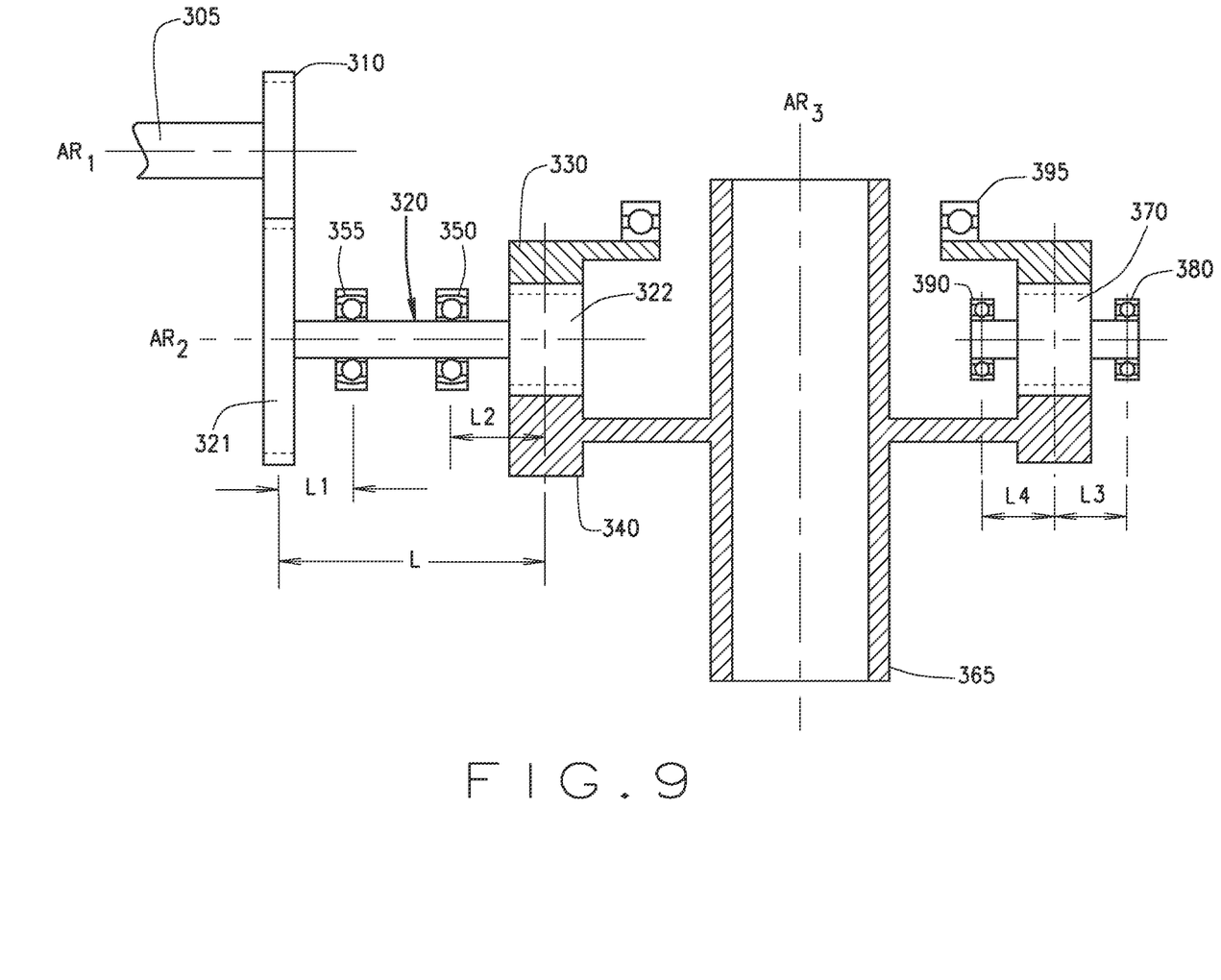
FIG. 9 is a sectional view of a face gear transmission incorporating the load sharing mechanisms of the present disclosure on the stepped cluster gear and idler gears.

Those of ordinary skill in the art will recognize that the load sharing mechanisms of the present disclosure are not limited to use in the planetary gear systems shown in FIGS. 1 and 7, but may be adapted for use in other types of gear transmissions, such as a split-torque face gear transmission as shown in FIG. 9. In a split-torque face gear transmission application, the first reaction gear takes the form of an idler face gear 330; the second reaction gear is a primary face gear 340 coupled to an output shaft 365. A drive cluster gear 320 defines the stepped gear, including a driven large gear 321 and a small drive gear 322. The split-torque face gear transmission further includes a set of idler pinions 370. The drive cluster gear 320 is supported by a pair of bearings, including a first bearing 355 and a second bearing 350, relative to a housing or planet carrier of the gear transmission. Each of the idler pinions 370 is straddle-mounted to the housing by a pair of bearings, including a third bearing 380 and a fourth bearing 390.

The large gear 321 of the drive cluster gear 320 meshes with, and is driven by an input drive gear 310, which in turn is coupled to an input shaft 305 and driving engine (not shown). The small drive gear 322 of the drive cluster gear 320 is sandwiched between, and meshes with, both the idler face gear 330, supported on bearings 395 relative to the housing, and the primary face gear 340. Similarly, the idler pinion 370 is sandwiched between, and meshed with, both the idler face gear 330 and the primary face gear 340. The rotational axis of the input gear $AR_1$, the rotational axis of the drive cluster gear 320 $AR_2$, and the rotational axis of the idler and primary face gears $AR_3$ each lie in a common plane S.

During operation, input power is transmitted from the input shaft 305 to the output shaft 365 through the split-torque face gear transmission. The power is split at the small drive gear 322, with portion being delivered directly to the primary face gear 340, and portion being delivered to the idler face gear 330. The idler pinion 370 then acts as a crossover gear, passing the power back from the idler face gear 330 to the primary gear 340. In doing so, the driving power is re-combined at the primary face gear 340 to drive the output shaft 365.

The amount of power split between the idler face gear 330 and the primary face gear 340 is determined, among other factors, by the positions of the bearings (350, 355, 380, and 390) along with the associated tangential support stiffness at the bearing positions. The relationships set forth in above Equations (1)-(22) are applicable to this embodiment, and may be utilized to selectively position the bearings to achieve the desired power split. Those of ordinary skill in the art will recognize that when applied to a split-torque face gear transmission, any radial dimensions referred to previously in Equations (1)-(22) should interpreted as axial directions.

Other variations and applications of the current disclosure are possible without deviating from the sprit of the disclosure. The embodiments and application disclosed herein should be considered as ways of explaining and implementing, not as ways of limiting the scope of the current disclosure. As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for designing a gear transmission (A), having a plurality of torque pathways between an input and an output, to achieve a selected load distribution among a set of drive planet pinions (22) and idler planet pinions (70), supported in a planet carrier (60, 160, 460) each disposed between a first reaction gear (30) and a second reaction gear (40), comprising:

determining a load portioning ratio $LR_T$ for said first and second reaction gears;

determining a force ratio for a pair of bearings (50, 55) supporting each of said drive planet pinions, and a force ratio for a pair of bearings (80, 90) supporting each of said idler planet pinions;

determining a pitch diameter ratio for a cluster gear assembly (20, 120) carrying said drive pinions;

selecting initial positions ($L_1$, $L_2$) for each pair of bearings supporting said drive planet pinions, and selecting initial positions ($L_3$, $L_4$) for each pair of bearings supporting said idler planet pinions;

calculating actual force ratios for each of said pairs of bearings at said selected initial positions;

calculating actual gear load proportioning ratios for said drive planet pinions and said idler planet pinions;

comparing said calculated actual support stiffness ratios and said calculated actual gear load ratios with associated predetermined ratio goals; and iteratively adjusting at least one bearing position for said bearings supporting said drive planet pinions or said bearings supporting said idler planet pinions with re-calculation of said support stiffness ratios for said pairs of bearings until said comparison step indicates that said actual support stiffness and said actual gear load proportioning ratio values are within an acceptable tolerance of said predetermined goals.

2. The method of claim 1 wherein said load portioning ratio $LR_T$ for said drive planet pinions and for said idler planet pinions is the ratio of the tangential meshing force generated between the first reaction gear (30) and the drive planet pinions (22), and the idler planet pinions (70), relative to the tangential meshing force generated between the second reaction gear (40) and the pinions (22, 70), according to:

$$LR_T \equiv \frac{F}{F + \Delta F}$$

wherein said force ratio $\phi_{21}$ for the pair of bearings (50, 55) supporting said drive planet pinions (22) is determined according to:

$$\phi_{21} \equiv \frac{Ft_2}{Ft_1}$$

wherein said force ratio $\phi_{43}$ for said pairs of bearings (80, 90) supporting said idler planet pinions (70) is determined according to:

$$\phi_{43} \equiv \frac{Ft_4}{Ft_3}$$

and wherein said pitch diameter ratio DR for a cluster gear assembly (20) carrying said drive planet pinions (22) is determined according to:

$$DR \equiv \frac{D_0}{D_1}$$

where $LR_T$ is a load portioning ratio between the two reaction gears (30, 40),
F is a tangential meshing force, $\varnothing_{21}$ is the ratio of bearing tangential forces between said pair of bearings (50, 55), $Ft_1$ and $Ft_2$ are loads in a tangential direction for said pair of bearings (50, 55), $\varnothing_{43}$ is the ratio of bearing tangential forces between said pair of bearings (80, 90) supporting an idler planet pinion (70), $Ft_3$ and $Ft_4$ are loads in a tangential direction for the second paid of bearings; and DR is a ratio of the radius $D_0$ of a mesh circle of a large gear (21) to the radius $D_1$, of the mesh circle of a drive planet pinion (22).

3. The method of claim 2 wherein said initial positions $L_1$, $L_2$ for each pair of bearings supporting said drive planet pinions (22) and initial positions $L_3$, $L_4$ for each pair of bearings supporting said idler planet pinions (70) are selected according to:

$$\frac{L_1 + \phi_{21}(L - L_2)}{L - L_1 + \phi_{21}L_2} = \left(\frac{1 - LR_T}{1 + LR_T}\right)\frac{D_0}{D_1} \text{ and}$$

$$\frac{L_3}{L_4} = \phi_{43}$$

where:

$D_0$ is the radius of the mesh circle to the large gear (21);

$D_1$ is the radius of the mesh circle of a drive pinion gear (22);

$L_1$ is the center distance from large gear (21) to the first support bearing (55);

$L_2$ is the center distance from drive pinion gear (22) to the second support bearing (50);

$L_3$ is the center distance from the idler gear (70) to the third bearing (80); and $L_4$ is the center distance from the idler gear (70) to the fourth bearing (90).

4. The method of claim 3 wherein force ratios for said pairs of bearings (50, 55) supporting each of said drive planet pinions and said pairs of bearings (80, 90) supporting each of said idler planet pinions at said selected initial positions ($L_1$, $L_2$, $L_3$, and $L_4$) are calculated according to:

$$\frac{KDt_2}{KDt_1} = \frac{Ft_2}{Ft_1} = \phi_{21}$$

$$\frac{KIt_4}{KIt_3} = \frac{Ft_4}{Ft_3} = \phi_{43}$$

$$KR \equiv \frac{KIt_3}{KDt_1} = \frac{2(1+\phi_{21})}{1+\phi_{43}} \cdot \frac{LR_T \cdot DR}{1 + LR_T + (1 - LR_T) \cdot DR}.$$

5. The method of claim 4 wherein actual gear load proportioning ratios for said drive planet pinions (22) and said idler planet pinions (70) are calculated according to:

$$LR_T = \frac{KR \cdot (1 + \phi_{43}) \cdot (DR + 1)}{2(1 + \phi_{21}) \cdot DR + KR \cdot (1 + \phi_{43}) \cdot (DR - 1)}.$$

6. The method of claim 1 wherein said selected load distribution among a set of drive planet pinions (22) and said set of idler planet pinions (70) is selected to be within the range of between 0.5 and 1.0.

7. The method of claim 1 having two torque pathways and wherein one of said torque pathways is through said gear transmission (A) and carries less load than the other torque pathway.

8. The method of claim 1 wherein one of said torque pathways is through said set of drive planet pinions (22) to said output, and another of said torque pathways is through said set of idler planet pinions (70) to said output, said set of idler planet pinions carrying less load than said set of drive planet pinions.

9. The method of claim 1 wherein said positions $L_1$ and $L_2$ of the drive plane pinion support bearings (50, 55, 350, 355) along the stepped gear assembly shaft are initially selected according to:

$$\frac{L + L_1 - L_2}{L - L_1 + L_2} = 0.1765 DR$$

where

L represents a spacing between gears (21, 22, 321, 322) of a gear assembly (20, 320);

$$DR \equiv \frac{D_0}{D_1}$$

$D_0$ is the pitch diameter of a large gear (21, 321) in the stepped gear assembly; and $D_1$ is the pitch diameter of the drive planet pinion (22, 322) in the stepped gear assembly.

10. The method of claim 1 further including the steps of:

providing at least one relief channel (431, 432, 433) in said planet carrier (460), said relief channel disposed to provide flexibility for said cluster gear assemblies (20, 120) in a circumferential direction, and for improved stress distribution; and, providing stiffened housings (470, 471) in an upper plate (410) and base hub (420) of the planet carrier (460) for hosting said bearings supporting said idler planet pinions (70).

11. The method of claim 10 wherein said idler planet pinion support bearings are initially disposed at positions $L_3$ and $L_4$ equidistant from an axial midpoint of said idler planet pinions.

12. The method of claim 10 wherein said transmission system (A) is one of an epicyclic gear train, or a split-torque face gear transmission.

13. An improved gear train (A, A1) having a plurality of pathways between an input and an output and including a drive sun gear (10, 310) coupled to an input shaft (1), an idler sun gear (30, 330), and a ring gear (40, 340), a set of drive planet gear clusters (20, 320) each including a large planet gear (21, 321) in engagement with the drive sun gear, and at least one small planet gear (22, 322) axially spaced along a planet shaft and in engagement with said idler sun gear and said ring gear, a set of idler planets each including an idler planet gear (70, 370) and an idler planet shaft, and a planet carrier (60, 160, 460) for supporting said gears, said idler planet gears in engagement with said idler sun gear and said ring gear, wherein the drive sun gear and the idler sun gear are co-axially arranged and spaced apart along a center axis $AR_1$, wherein the ring gear is disposed co-axially around the idler sun gear, wherein the drive planet gear clusters are arranged in an annular region between the ring gear and the idler sun gear, wherein the idler planet gears are arranged in the annular space between the ring gear and the idler sun gear, the improvement comprising:

for each drive planet gear cluster, a pair of bearings (50, 55) disposed about said associated planet shaft in axial positions $L_1$ and $L_2$ selected to achieve a desired load distribution ratio for torque transfer through said drive planet gear clusters and said idler planet gears.

14. The improved gear train of claim 13 wherein said desired load distribution for said torque transfer between said idler planet gears (70, 370) and said drive planet gear clusters (20, 320) is $LR_T$, and wherein said pair of bearings (50, 55) supporting said drive planet gear cluster has a tangential stiffness ratio $\phi_{21}$, said axial positions $L_1$, $L_2$ of said bearings in each pair selected according to:

$$\frac{L_1 + \phi_{21}(L - L_2)}{L - L_1 + \phi_{21}L_2} = \left(\frac{1 - LR_T}{1 + LR_T}\right)\frac{D_0}{D_1}$$

where:
$D_0$ is the radius of the mesh circle to the large gear (21);
$D_1$ is the radius of the mesh circle of a drive pinion gear (22);
$L_1$ is the center distance from large gear (21) to the first support bearing (55);
$L_2$ is the center distance from the small drive pinion gear (22) to the second support bearing (50);
$L_3$ is the center distance from the idler gear (70) to the third bearing (80);
$L_4$ is the center distance from the idler gear (70) to the fourth bearing (90);
$LR_T$ is a load portioning ratio between a first reaction gear (30) and a second reaction gear (40), and,
$\phi_{21}$ is the ratio of bearing tangential forces between a first pair of bearings (50, 55).

15. The improved gear train of claim 13 wherein said desired load distribution for said torque transfer is 70% between said idler planet gear clusters (70, 370) and said drive planet gear clusters (20, 320), and wherein each bearing in said pair of bearings (50, 55) supporting said drive planet cluster has equal axial stiffness, said axial positions $L_1$, $L_2$ of said bearings in each pair selected according to:

$$\frac{L + L_1 - L_2}{L - L_1 + L_2} = 0.1765 DR$$

where
L represents a spacing between a large gear (21) and said small planet gear (22) of the drive planet cluster;

$$DR \equiv \frac{D_0}{D_1}$$

$D_0$ is the pitch diameter of said large planet gear (21, 321) in the drive planet cluster; and
$D_1$ is the pitch diameter of said small planet gear (22, 322) in the drive planet cluster.

16. The improved gear train of claim 13 wherein said idler planet gears (70, 370) are each supported at opposite axial ends by a pair of equal-stiffness support bearings (80, 90), said idler planet gear cluster support bearings each disposed at positions $L_3$ and $L_4$ equidistant from an axial midpoint of said associated idler planet gear cluster.

17. The improved gear train of claim 13 wherein said transmission system (A) is a epicyclic gear train, further including a planet carrier (60, 160, 400) including a planet carrier base (162, 420) and a planet carrier plate (164, 410), said planet carrier plate disposed axially opposite from said drive sun gear (10, 310) and coupled to an output shaft, said planet carrier supporting said support bearings (80, 90) for said drive planet gear clusters (20, 320) and for said idler planet gears (70, 370), said planet carrier base (162, 420) being axially displaced from said planet carrier plate (164, 410) by a conically tapered portion (168) surrounding a splined axial boss (169), and wherein said planet carrier plate is coupled to said planet carrier base at said splined axial boss and adjacent an outer perimeter by a set of axially aligned posts (166, 460).

18. The improved gear train of claim 13 wherein each of said pair of bearings (80, 90) supporting each of said drive planet gear clusters (20, 320) in said planet carrier (460) are disposed within a housing (440), and wherein said planet carrier (460) further includes at least one relief channel (431, 432, 433) associated with each of said housings, said relief channels disposed to provide tangential flexibility for each drive planet gear cluster in a circumferential direction, and for improved stress distribution, said planet carrier (400) further including a plurality of reinforced housings (470) in an upper plate (410) and a plurality of reinforced housings (471) in a base hub (420) for hosting bearings supporting said idler planet gears (70, 370) in a rigid mounting, and said planet carrier (400) being configured to provide tangential flexibility, said bearings (50, 55) being disposed about said associated planet shafts in a circumferential direction, for improved stress distribution and to maintain the alignment as the axis of each planet shaft as the planet shaft is carried circumferentially.

19. The improved gear train of claim 13 wherein said transmission system (A1) is a split-torque face gear transmission wherein said desired load distribution for said torque transfer between said drive planet gear clusters (20, 320) and said idler planet gears (70, 370) is $LR_T$, and wherein said pair of bearings supporting (50, 55) said drive planet gear clusters has a stiffness ratio $\phi_{21}$, said axial positions $L_1$ and $L_2$ of said bearings in each pair, having equal stiffness, are selected according to:

$$\frac{L_1 + \phi_{21}(L - L_2)}{L - L_1 + \phi_{21}L_2} = \left(\frac{1 - LR_T}{1 + LR_T}\right)\frac{D_0}{D_1}$$

where
L represents a spacing between said large planet gear (321) and said small planet gear (322) of the drive planet gear cluster (320);
$D_0$ is a pitch diameter of a large planet gear (21, 321) in the drive planet gear cluster; and
$D_1$ is a pitch diameter of a small planet gear (22, 322).

20. The improved split-torque face gear train of claim 19 wherein said desired load distribution for said torque transfer is 70% between said idler planet gears and said small planet gears, and wherein said axial positions $L_1$ and $L_2$ of said bearings in each pair, having equal stiffness, are selected according to:

$$\frac{L+L_1-L_2}{L-L_1+L_2} = 0.1765 DR$$

where
L represents a spacing between said large planet gear and said small planet gear of each drive planet gear cluster;

$$DR \equiv \frac{D_0}{D_1}$$

$D_0$ is a pitch diameter of a large planet gear; and
$D_1$ is a pitch diameter of a small planet gear; and, wherein said idler planet gears (70, 370) are each supported at opposite axial ends by a pair of support bearings (380, 390) in a straddle-mount configuration, said idler planet gear support bearings each disposed at positions $L_3$ and $L_4$ equidistant from an axial midpoint of said associated idler planet gear.

* * * * *